Sept. 15, 1936.    G. E. CHEDRU    2,054,063
SUSPENSION DEVICE
Filed March 8, 1933    4 Sheets-Sheet 1
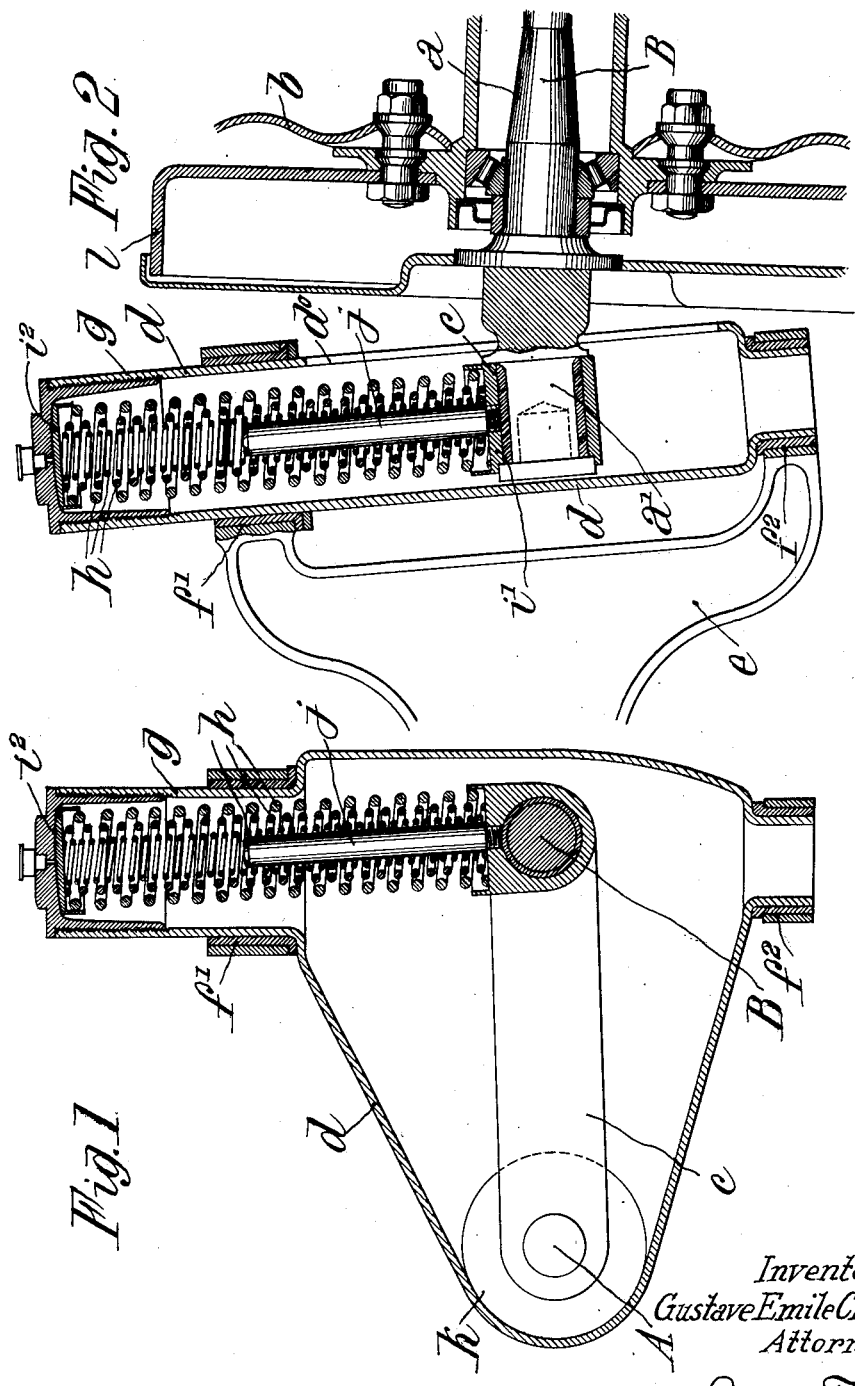
Inventor:
Gustave Emile Chedru
Attorney:

Sept. 15, 1936.  G. E. CHEDRU  2,054,063
SUSPENSION DEVICE
Filed March 8, 1933  4 Sheets-Sheet 2
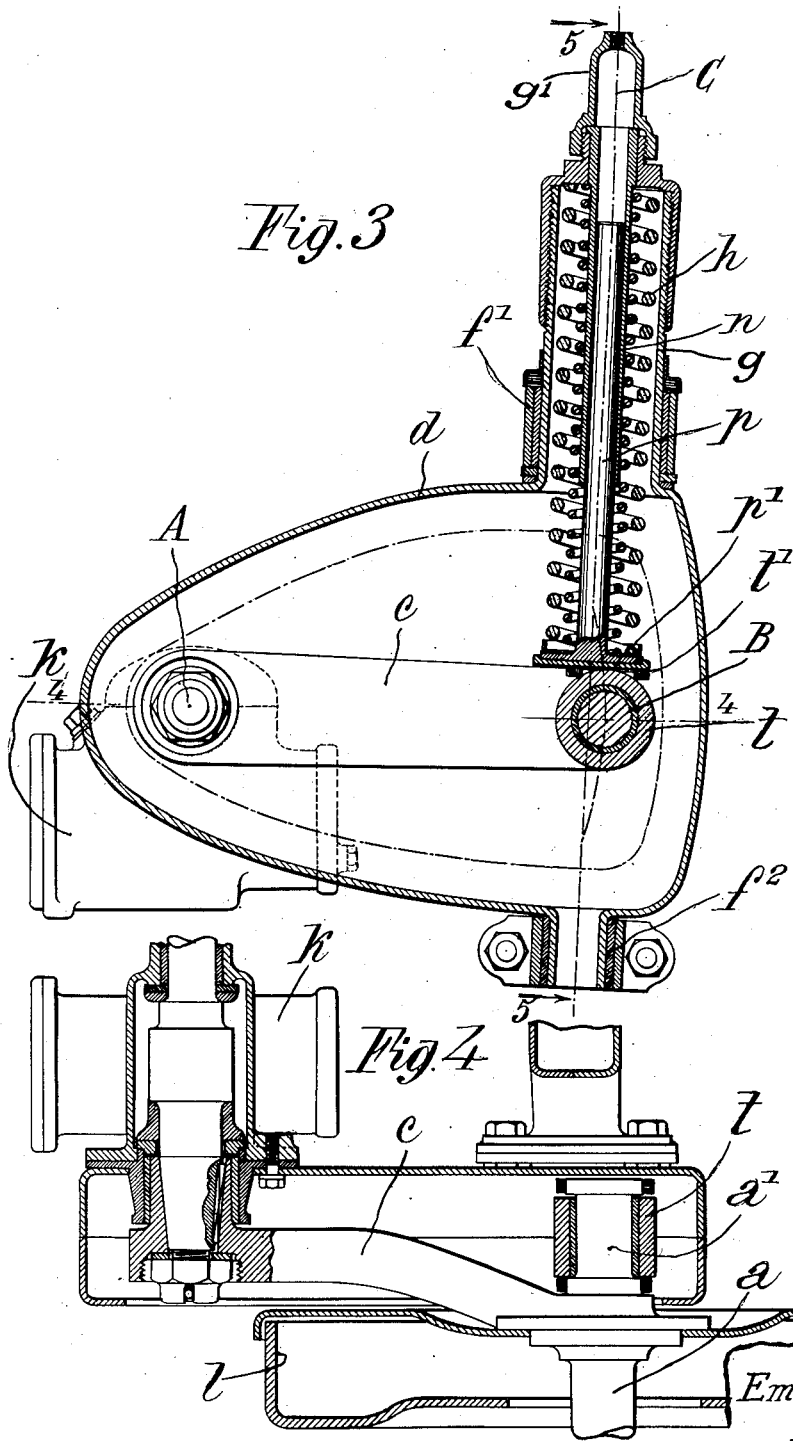
Inventor:
Gustave
Emile Chedru
Attorney:

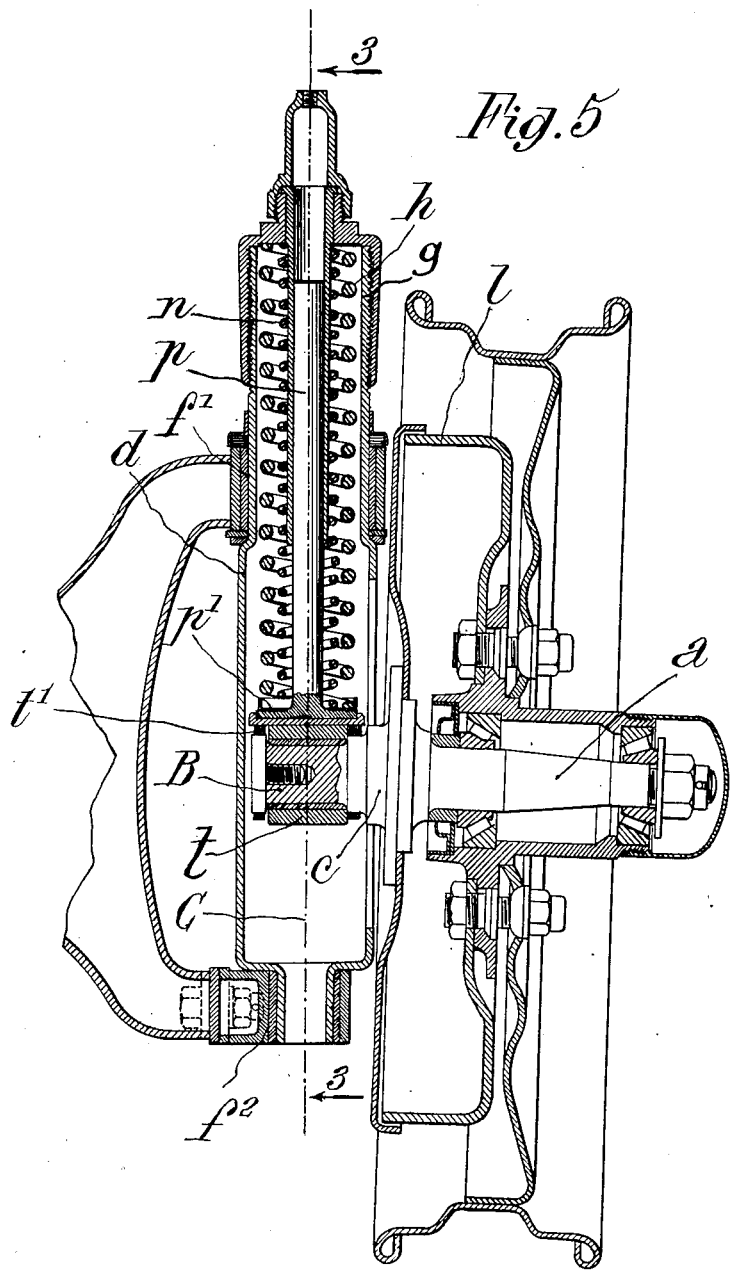

Sept. 15, 1936. G. E. CHEDRU 2,054,063
SUSPENSION DEVICE
Filed March 8, 1933 4 Sheets-Sheet 4
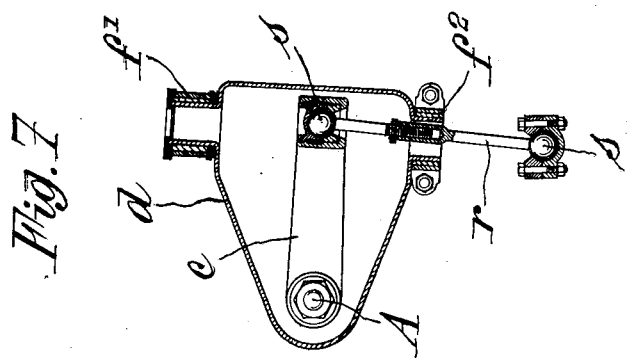
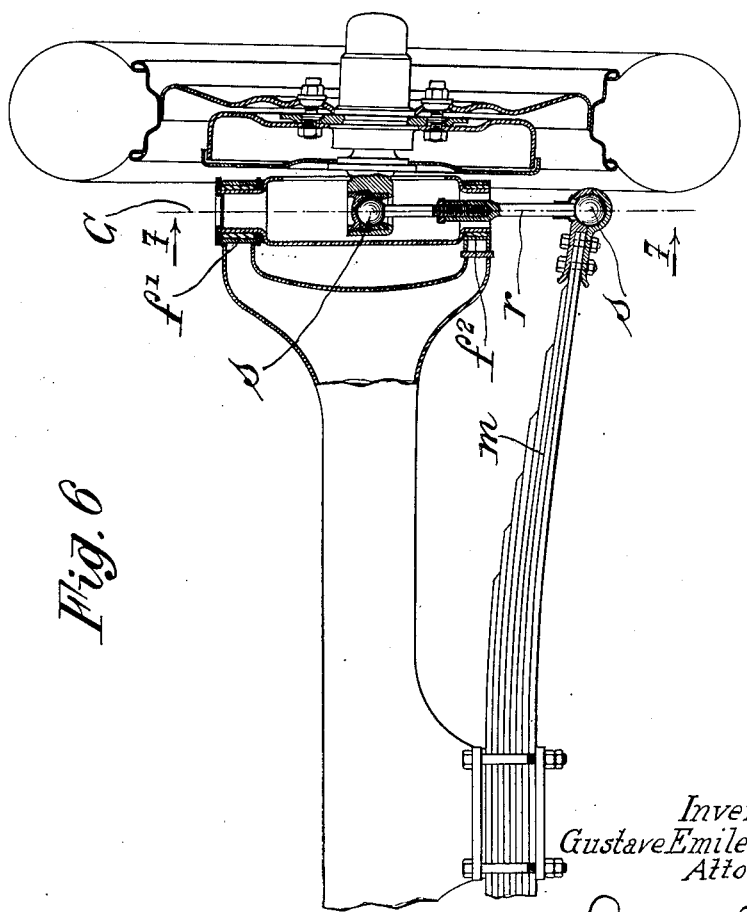
Inventor:
Gustave Emile Chedru
Attorney:

Patented Sept. 15, 1936

2,054,063

UNITED STATES PATENT OFFICE 2,054,063

SUSPENSION DEVICE

Gustave Emile Chédru, Neauphle-le-Chateau, France, assignor to André Dubonnet, Neuilly-sur-Seine, France Application March 8, 1933, Serial No. 660,069
In Belgium January 7, 1933

25 Claims. (Cl. 267—20)

My invention relates to suspension devices for vehicles and especially for motor vehicles, and it is more particularly concerned with suspension devices for independent directing of front wheels.

The object of my invention is to provide devices of that kind that are both cheaper to manufacture and more efficient in their working than those used at the present time.

The suspension devices to which my invention relates include an arm pivoted to the frame or any suspended part of the vehicle and carrying with it at its pivoting end the wheel axle, elastic means being provided for opposing upward displacements of said arm.

A first feature of my invention consists in so disposing the parts that the pivoting arm moves on either side of a horizontal plane passing through the axis about which it pivots.

Another feature of my invention consists in the fact that the elastic means act on said arm preferably in a direction that passes substantially through, or very close to, the wheel axle, so that said arm is not subjected to bending stresses that might result in injuring it, and necessitate the provision of a strong and therefore heavy pivoting arm.

Another feature of my invention consists in supporting the pivoting arm in a casing that is pivoted to the frame of the vehicle through vertical pivoting joints disposed respectively above and below the horizontal plane that passes through the axis about which said arm pivots.

My invention further comprises several new and advantageous arrangements of the elastic means for preventing upward displacements of the pivoting arm.

Preferred embodiments of the present invention will be hereinafter described, with reference to the accompaying drawings, given merely by way of example, and in which:

Fig. 1 is a vertical sectional view of a first embodiment of the device according to my invention;

Fig. 2 is a corresponding sectional view at right angles to Fig. 1;

Fig. 3 relates to another embodiment of my invention and is a sectional view on the line 3—3 of Fig. 5;

Fig. 4 is a sectional view on the line 4—4 of Fig. 3;

Fig. 5 is a sectional view on the line 5—5 of Fig. 3;

Fig. 6 is an elevational front view, partly in section, showing still another embodiment of my invention;

Fig. 7 is a sectional view on the line 7—7 of Fig. 6, showing only a part of the elements disclosed in said figure.

In a general manner the chief characteristics of my invention are the following:

a. The axle trunnion $a$ of each of wheels $b$ is carried by an arm $c$ pivotally connected to the frame or suspended part of the vehicle so as to rotate about an axis A substantially parallel to the axis B of the axle trunnion. It should be noted, that according to my invention, the axis A about which arm $c$ pivots, may be disposed either ahead of the axle trunnion, with reference to the direction of travel of the vehicle, or behind it.

b. Elastic means are adapted to act on arm $c$ so as to oppose the upward rotation thereof.

c. The whole is so arranged that the positions of the arm corresponding to the extreme upper and lower positions of the wheel, are located on either part of a horizontal plane passing through axis A, the average position of said arm being advantageously located in that plane.

The elastic means referred to in paragraph $b$ may, according to my invention, be devised in several ways; for instance they may consist either of spiral springs such as spring $h$ of Figs. 1–5, or of leaf springs such as shown at $m$ in Figs. 6–7.

An important feature of my invention is that said elastic means, of whatever kind they may be, act on arm $c$, or on an element rigidly connected therewith, preferably in a direction that passes substantially through or very close to, the axis B of the wheel axle, the force exerted by said elastic means being substantially vertical when the mean position of arm $c$ is horizontal.

This feature makes it possible to obtain a very simple suspension device in which arm $c$ is not subject to bending stresses.

The principle of the suspension device according to my invention is particularly adapted to be applied to independent directing wheels, for instance the front wheels. Therefore, in the following description of my invention, I will now exclusively refer to that application of my invention.

In the preferred embodiments of my invention that are shown in the drawings, arm $c$ is pivoted about axis A in a casing $d$. Said casing is itself connected to the frame of the vehicle, for instance to a cross member or axle tree $e$ of said frame in such manner as to be adapted to pivot about axis C. Said axis C corresponds with the axis about which the wheels are to rotate when the vehicle turns, and preferably makes a small angle with the vertical direction, in a transversal plane.

The elastic means that oppose upward displacements of arm $c$ are so devised that the effort that they exert is directed substantially along axis C so that, if the axis B of the stub axle $a$ is itself substantially in the vertical plane of said axis C (with which it intersects for instance when arm $c$ is in its extreme positions) said effort shall always be so directed as to pass through the axis B of the stub axle, or at least close to said axis.

According to the preferred embodiments of my invention that are disclosed in the drawings, casing $d$ is preferably pivoted on bearings $f^1$, $f^2$ located on either side of the horizontal plane passing through the axis about which arm $c$ pivots. Ball bearings may eventually be interposed between said bearings and the parts of said casing that engage therein.

A vertical section of said casing is for instance given the general shape of a triangle, one of the apexes of which is disposed on the side of axis A, and the two other apexes of which are located close to bearings $f^1$, $f^2$, the angle of the first mentioned apex being so chosen as to permit oscillations of sufficient amplitude of arm $c$.

A slot $d^0$ is provided in the side of said casing that is located opposite the wheel, so that stub axle $a$ may pass through said slot.

I will now proceed to describe separately the various embodiments of the elastic means for opposing upward displacements of arm $c$.

The first species includes the utilization of one or several spiral springs which may be disposed either concentrically or parallelly with one another.

In the embodiments of Figs. 1-5, I have illustrated the use of spiral springs coaxially disposed with respect to one another.

Said springs are advantageously disposed above arm $c$ so as to be in compression and they extend in an upward direction, partly inside casing $d$ and partly inside a cylinder $g$ formed as an upward projection of said casing. As shown in Figs. 1-5 said cylinder is advantageously journalled in the upper bearing $f^1$ which is accordingly given a suitable inner diameter.

In the embodiment of my invention shown in Figs. 1 and 2, the upper and lower ends of the springs $h$ are connected to fixed points of casing $d$ and of arm $c$ respectively so that the direction of the longitudinal axis of said springs varies according to the position of said arm. For instance, said lower and upper ends of the springs bear against surfaces carried by the cup-shaped members $i^1$ and $i^2$ respectively. Said members $i^1$ and $i^2$ are movably mounted in arm $c$ and casing $d$ respectively so that they can adapt themselves to the variations in the inclination of the axis of the spring. The lower cup-shaped member $i^1$ is for instance pivotally mounted about an extension $a^1$ of stub axle $a$ and the upper cup-shaped member $i^2$ rests upon the upper end of the cylinder $g$, through a spherical surface permitting it to oscillate. Of course the last mentioned cup-shaped member $i^2$ might be jointed to the end of cylinder $g$.

The device according to my invention further comprises guiding means for allowing the axis of spring $h$ to remain rectilinear. Said means may consist, in the case of coaxial springs as shown in the drawings, of a rod $j$ rigidly fixed to cup-shaped member $i^1$, and disposed inside the inner spring of lesser diameter.

I might also dispose the whole of the springs within telescopic cylinders, the ends of which would constitute the surfaces against which the ends of the springs bear. Obviously any suitable means for guiding the springs might be used according to my invention.

According to the second embodiment of my invention shown in Figs. 3-5, the longitudinal axis of springs $h$ is given a fixed position, and it is then necessary to provide a sliding connection between the lower end of said springs and arms $c$.

As shown in the drawings, springs $h$ are wound about a hollow sleeve $n$ which may be disposed for instance coaxially with cylinder $g$, that is to say, in line with axis C, said tube being rigidly fixed to said cylinder $g$.

A rod $p$, the lower end of which carries a disc $p^1$, is slidably mounted within said tube $n$. Said disc $p^1$ is adapted, on the one hand to receive on its upper face the thrust of springs $h$, and on the other hand to bear, in a sliding manner, through its under face, against the end of arm $c$ or upon extension $a^1$ of said arm as above disclosed. Preferably there is interposed between disc $p^1$ and extension $a^1$, a roller $t$ mounted loose on said extension $a^1$.

In order to maintain the surface of said disc $p^1$ that slides on roller $t$ constantly clean, I may further provide felt bands adapted to rub against said surface, and which are for instance secured to part $a^1$.

It will be readily understood that such a device works in a perfectly safe manner, since the guiding of rod $p$ in sleeve $n$ provides for the axis of the springs remaining constantly rectilinear.

The bending stresses to which said rod may be subjected are very much reduced if, in the lowest position of the wheel, for which position the portion of rod $p$ that is guided inside sleeve $n$ is reduced to a minimum and the bending stresses are therefore most to be feared, the axis of stub axle $a$ comes to intersect axis $C$.

I further preferably combine with either of the devices above described, shock absorbing means adapted to brake the angular displacements of arm $c$.

Said means may be of any suitable kind, but they preferably consist either of a device of the friction type such as shown at $k$ in Figs. 1 and 2, or of a hydraulic system (Figs. 3-5) or again of any other shock absorber exerting its action on spindle A.

I further combine with either of the devices above described a brake $l$ of any type whatever.

It should be noted that the structure consisting of the whole of casing $d$, bearings $f^1$, $f^2$ and cylinder $g$, can be very simply built by assembling two shells made from steel sheets stamped and electrically welded along their edges. In this case each shell corresponds to one half of said composite structure, the latter being supposed to be cut through by a longitudinal plane passing through the axis about which said casing pivots.

Finally, I may easily fit the headlights of the vehicle in line with cylinders $g$, for instance on supports such as $g^1$, Fig. 3. Said headlights would then pivot simultaneously with casings $d$.

If now it is desired to utilize leaf springs instead of spiral springs, I adopt the embodiments hereinafter described with reference to Figs. 6 and 7.

Casing $d$ and arm $c$ are made in the same manner as above described.

The elastic force that is to oppose the upward rotation of arm $c$, is then applied to the end of said arm $c$ that carries the stub axle preferably, as shown in Figs. 6 and 7, through a single transversal half-elliptic spring $m$, the ends of which cooperate with the two independent wheels respectively. The action of said spring is transmitted to arm $c$ for instance through a connecting rod $r$ jointed to the corresponding ends of arm $c$ and of spring $m$ through ball and socket joints.

Advantageously said connecting rod will extend throughout lower bearing $f^2$ when spring $m$ is located at a lower level than said bearing.

Finally the different embodiments that have been above described could obviously be adapted to front driving-wheels, in which case the face of casing $d$ that is located on the side of the engine would be suitably slotted for affording a passage for the propeller shaft.

Whatever be the embodiment of my invention that is chosen, the operation thereof will be readily understood and it is therefore believed unnecessary to describe it.

The suspension device according to my invention has over the devices of the same kind that already exist, many advantages among which I may state the following:

*a*. It occupies very little space;

*b*. It is not expensive to manufacture; and

*c*. It forms both a shock absorbing device and an elastic suspension device when the oscillations of arm $c$ are braked as shown in any of the embodiments of Figs. 1 to 5.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. In a vehicle including a frame and a plurality of wheels, a suspension device comprising in combination, a casing having a sector-shaped longitudinal vertical section, said casing extending above and below the horizontal plane passing through the centre of said sector, a vertical trunnion provided at the top of said casing, a vertical trunnion in line with the first mentioned one provided at the bottom of said casing, two vertical bearings in line with each other rigidly supported by said frame and adapted to receive the two above mentioned trunnions respectively, an arm pivoted in said casing about a substantially horizontal transverse axis passing substantially through the centre of said sector so as to be able to rotate up and down in said casing, a wheel axle carried by the pivoting end of said arm, and elastic means for opposing upward displacements of said arm, said means being so devised that the normal mean position of said arm is in a horizontal plane passing through the last mentioned axis.

2. In a vehicle including a frame and a plurality of wheels, a suspension device comprising in combination, a casing having a sector-shaped longitudinal vertical section, said casing extending above and below the horizontal plane passing through the centre of said sector respectively, a vertical trunnion provided at the top of the upper face of said casing, a vertical trunnion in line with the first mentioned one provided at the bottom of the lower face of said casing, two vertical bearings in line with each other rigidly supported by said frame and adapted to receive the two above mentioned trunnions respectively, an arm pivoted in said casing about a substantially horizontal transverse axis passing substantially through the centre of said sector so as to be able to rotate up and down in said casing, a wheel axle carried by the pivoting end of said arm, and elastic means for exerting on said arm a force which opposes upward displacements thereof, and which is so directed as to pass close to the axis of said wheel axle, said means being so devised that the normal mean position of said arm is in a horizontal plane passing through the last mentioned axis.

3. In a vehicle including a frame and a plurality of wheels, a suspension device comprising in combination, a casing having a sector-shaped longitudinal vertical section, said casing extending above and below the horizontal plane passing through the centre of said sector, a vertical trunnion provided at the top of said casing, a vertical trunnion in line with the first mentioned one provided at the bottom of said casing, two vertical bearings in line with each other rigidly supported by said frame and adapted to receive the two above mentioned trunnions respectively, an arm pivoted in said casing about a substantially horizontal transverse axis passing substantially through the centre of said sector, so as to be able to rotate up and down in said casing, a wheel axle carried by the pivoting end of said arm, the first mentioned trunnion extending upwardly so as to form a cylinder that projects from the upper face of the corresponding bearing and the upper end of which is closed, and at least one spiral spring interposed between the upper end of said cylinder and said arm so that the axis of said spring passes substantially through the axis of said wheel axle.

4. In a vehicle including a frame and a plurality of wheels, a suspension device comprising in combination, a casing having a sector-shaped longitudinal vertical section, said casing extending above and below the horizontal plane passing through the centre of said sector, a vertical trunnion provided at the top of said casing, a vertical trunnion in line with the first mentioned one provided at the bottom of said casing, two vertical bearings in line with each other rigidly supported by said frame and adapted to receive the two above mentioned trunnions respectively, an arm pivoted in said casing about a substantially horizontal transverse axis passing substantially through the centre of said sector so as to be able to rotate up and down in said casing, a wheel axle carried by the pivoting end of said arm, the first mentioned trunnion extending upwardly so as to form a cylinder that projects from the upper face of the corresponding bearing and the upper end of which is closed, at least one spiral spring interposed between the upper end of said cylinder and said arm so that the axis of said spring passes substantially through the axis of said wheel axle, and spring guiding means for maintaining said spring in a rectilinear position.

5. In a vehicle including a frame and a plurality of wheels, a suspension device comprising in combination, a casing having a sector-shaped longitudinal vertical section, said casing extending above and below the horizontal plane passing through the centre of said sector, a vertical trunnion provided at the top of said casing, a vertical trunnion in line with the first mentioned one provided at the bottom of said casing, two vertical bearings in line with each other rigidly supported by said frame and adapted to receive the two above mentioned trunnions respectively, an arm pivoted in said casing about a substantially horizontal transverse axis passing substantially through the centre of said sector so as to be able to rotate up and down in said casing, a wheel axle carried by the pivoting end of said arm, the first mentioned trunnion extending upwardly so as to form a cylinder that projects from the upper face of the corresponding bearing and the upper end of which is closed, a cup-shaped member adapted to pivot in the upper end of said cylinder, a cup-shaped member adapted to pivot on the end of said arm close to the point thereof that carries said wheel axle, at least one spring the ends of which are inserted in said cup-shaped members respectively and guiding means fixed to at least one of said cup-shaped members for maintaining that spring in a rectilinear position.

6. In a vehicle including a frame and a plurality of wheels, a suspension device comprising in combination, a casing having a sector-shaped longitudinal vertical section, said casing extending above and below the horizontal plane passing through the centre of said sector, a vertical trunnion provided at the top of said casing, a vertical trunnion in line with the first mentioned one provided at the bottom of said casing, two vertical bearings in line with each other rigidly supported by said frame and adapted to receive the two above mentioned trunnions respectively, an arm pivoted in said casing about a substantially horizontal transverse axis passing substantially through the centre of said sector, so as to be able to rotate up and down in said casing, a wheel axle carried by the pivoting end of said arm, the first mentioned trunnion extending upwardly so as to form a cylinder that projects from the upper face of the corresponding bearing and the upper end of which is closed, a cup-shaped member adapted to pivot in the upper end of said cylinder, a cup-shaped member adapted to pivot on the end of said arm coaxially with said wheel axle, a guiding rod fixed to the last mentioned cup-shaped member and extending in the direction of the first mentioned cup-shaped member, and at least one spring wound around said rod and the ends of which are inserted in said cup-shaped members respectively.

7. In a vehicle including a frame and a plurality of wheels, a suspension device comprising in combination, a casing having a sector-shaped longitudinal vertical section said casing extending above and below the horizontal plane passing through the centre of said sector, a vertical trunnion provide at the top of said casing, a vertical trunnion in line with the first mentioned one provided at the bottom of said casing, two vertical bearings in line with each other rigidly supported by said frame and adapted to receive the two above mentioned trunnions respectively, an arm pivoted in said casing about a substantially horizontal transverse axis passing substantially through the centre of said sector so as to be able to rotate up and down in said casing, a wheel axle carried by the pivoting end of said arm, the first mentioned trunnion extending upwardly so as to form a cylinder that projects from the upper face of the corresponding bearing and the upper end of which is closed, a rod slidably guided in the upper end of said cylinder so as to extend in the direction of the pivoting end of said arm, a disc at the lower end of said rod adapted to bear against said arm at a point thereof close to the axis of said wheel axle, and at least one spiral spring wound about said rod, and the ends of which bear against the upper end of the cylinder and the upper face of said disc respectively.

8. In a vehicle including a frame and a plurality of wheels, a suspension device comprising in combination, a casing having a sector-shaped longitudinal vertical section, said casing extending above and below the horizontal plane passing through the centre of said sector, a vertical trunnion provided at the top of said casing, a vertical trunnion in line with the first mentioned one provided at the bottom of said casing, two vertical bearings in line with each other rigidly supported by said frame and adapted to receive the two above mentioned trunnions respectively, an arm pivoted in said casing about a substantially horizontal transverse axis passing substantially through the centre of said sector so as to be able to rotate up and down in said casing, a wheel axle carried by the pivoting end of said arm, the first mentioned trunnion extending upwardly so as to form a cylinder that projects from the upper face of the corresponding bearing and the upper end of which is closed, a sleeve rigidly fixed to the upper end of said cylinder and extending in the direction of the pivoting end of said arm, a rod adapted to slide under said sleeve, a roller journalled on the end of said arm coaxially with said wheel axle, a disc at the lower end of said rod adapted to bear against said roller, and at least one spiral spring wound about said rod, and the ends of which bear against the upper end of the cylinder and the upper face of said disc respectively.

9. In a vehicle including a frame and a plurality of wheels, a suspension device comprising in combination, a casing having a sector shaped longitudinal vertical section, said casing extending above and below the horizontal plane passing through the center of said sector, a vertical trunnion provided at the top of said casing, a vertical trunnion in line with the first mentioned one provided at the bottom of said casing, two vertical bearings in line with each other rigidly supported by said frame and adapted to receive the two above mentioned trunnions respectively, an arm pivoted in said casing about a substantially horizontal transverse axis passing substantially through the center of said sector so as to be able to rotate up and down in said casing, a wheel axle carried by the pivoting end of said arm, a leaf spring fixed to said frame, and means connecting the end of said spring to a point of said arm located close to the axis of said wheel axle, so as to exert on said arm a force opposing upward displacements of said arm and passing substantially through the axis of said wheel axle.

10. In a vehicle including a frame and a plurality of wheels, a suspension device comprising in combination, a casing having a sector shaped longitudinal vertical section, said casing extending above and below the horizontal plane passing through the center of said sector, a vertical trunnion provided at the top of said casing, a vertical trunnion in line with the first mentioned one provided at the bottom of said casing, two vertical bearings in line with each other rigidly supported by said frame and adapted to receive the two last mentioned trunnions respectively, an arm pivoted in said casing about a substantially horizontal transverse axis passing substantially through the center of said sector so as to be able to rotate up and down in said casing, a wheel axle carried by the pivoting end of said arm, a leaf spring fixed to said frame, a connecting rod, ball and socket joints for connecting the ends of said rod to the end of said spring and to a point of said arm close to the axis of said wheel axle respectively, so as to exert on said arm a force opposing upward displacements of said arm and passing substantially through the axis of said wheel axle.

11. In a vehicle, a chassis, a member pivoted at two vertically spaced points on said chassis to turn about a substantially vertical axis, an arm pivoted on said member to turn about a substantially horizontal transverse axis, said second axis lying in a horizontal plane which passes between said pivot points, a wheel axle carried by said arm, and elastic means engaging said arm at its point of connection with the axle to exert on said arm a force which opposes upward displacements thereof and which passes substantially through the axis of said wheel axle.

12. In a vehicle, a chassis, a member pivoted at two vertically spaced points on said chassis to turn about a substantially vertical axis, an arm pivoted on said member to turn about a substantially horizontal transverse axis, said second axis lying in a horizontal plane which passes between said pivot points, a wheel axle carried by said arm, and elastic means engaging said arm at its point of connection with the axle to exert on said said arm a force which opposes upward displacements thereof and which passes substantially through the axis of said wheel axle, said last means being of such strength that the normal position of said arm is in a horizontal plane passing through its horizontal axis.

13. A suspension device for vehicles comprising a chassis, an arm pivoted on said chassis to turn about a substantially horizontal axis, a wheel spindle carried by said arm, and means to resist upward movement of said arm comprising a resilient element engaging said arm and chassis, and means mounted to turn angularly in accordance with the bodily angular movements of said resilient means for supporting the ends of said resilient member.

14. A suspension device for vehicles comprising a chassis, an arm pivoted on said chassis to turn about a substantially horizontal axis, a wheel spindle carried by said arm, and means to resist upward movement of said arm comprising members on said chassis, and a resilient element mounted between said members, said members being mounted to turn angularly in accordance with the bodily angular movements of the resilient member.

15. A suspension device for vehicles comprising an arm to turn about a substantially horizontal axis, a wheel spindle carried by said arm, and means to resist upward movement of said arm comprising members on said chassis and a coil spring mounted between said members, said members being mounted to turn angularly in accordance with the bodily angular movements of said spring.

16. In a vehicle including a frame and a plurality of wheels, a suspension device comprising in combination, a rigid supporting member pivoted to said frame about a substantially vertical axis, an arm pivoted in said member about a substantially horizontal transverse axis, a wheel axle carried by said arm, and elastic means engaging said arm as to oppose upward displacements thereof and being so arranged that the direction of its force is substantially coaxial with said vertical axis and passes substantially through the axis of said wheel axle.

17. A steering wheel mounting for a vehicle having a chassis, comprising a member mounted to turn on said chassis about a substantially vertical axis, said member extending rearwardly of said axis, an arm pivoted on said member at a point to the rear of said vertical axis to turn about a substantially horizontal axis, said arm extending forwardly from its pivot, means yieldingly resisting upward movement of said arm, a wheel spindle carried by said arm at a point in substantially transverse alignment with said vertical axis, said member and said arm comprising a turning set so formed and arranged that the center of gravity thereof is situated rearwardly of said vertical axis.

18. A suspension device for vehicles comprising a chassis to turn about a substantially horizontal axis, a wheel spindle carried by said arm, means to resist upward movement of said arm comprising members on said chassis, and a coil spring mounted between said members, said members being mounted to turn angularly in accordance with angular bodily movements of said spring, and guiding means adapted to maintain the axis of said spring rectilinear at all times.

19. A steering wheel mounting for a vehicle having a chassis, comprising a member mounted to turn on said chassis about a substantially vertical axis, said member extending rearwardly of said axis, an arm pivoted on said member at a point to the rear of said vertical axis to turn about a substantially horizontal axis, means yieldingly resisting upward movement of said arm, and a wheel spindle carried by said arm, said member and said arm comprising a turning set so formed and arranged that the center of gravity thereof is situated rearwardly of said vertical axis.

20. A steering wheel mounting for a vehicle having a chassis, comprising a member mounted to turn on said chassis about a substantially vertical axis, said member extending rearwardly of said axis, an arm pivoted on said member at a point to the rear of said vertical axis to turn about a substantially horizontal axis, means yieldingly resisting upward movement of said arm, and a wheel spindle carried by said arm forwardly of said horizontal axis, said yielding means engaging said arm forwardly of said horizontal pivot.

21. A steering wheel mounting for a vehicle having a chassis, comprising a member mounted to turn on said chassis about a substantially vertical axis, said member extending rearwardly of said axis, an arm pivoted on said member at a point to the rear of said vertical axis to turn about a substantially horizontal axis, said arm extending forwardly from its pivot, means yieldingly resisting upward movement of said arm, and a wheel spindle carried by said arm at a point in substantially transverse alignment with said vertical axis, said yielding means engaging said arm forwardly of said horizontal pivot.

22. A steering wheel mounting for a vehicle having a chassis, comprising a member mounted to turn on said chassis about a substantially vertical axis, said member extending rearwardly of said axis, an arm pivoted on said member at a point to the rear of said vertical axis to turn about a substantially horizontal axis, said arm extending forwardly from its pivot, and a wheel spindle carried by said arm at a point in front of said horizontal axis and substantially adjacent the vertical axis, said yielding means engaging said arm forwardly of said horizontal pivot.

23. A steering wheel mounting for a vehicle having a chassis comprising in combination a casing having a sector-shaped longitudinal vertical section pivoted to said frame about a substantially vertical axis and extending rearwardly of said axis, an arm pivoted in said casing at a point to the rear of said vertical axis to turn about a substantially horizontal axis, said arm extending forwardly from its pivot, means yieldingly resisting upward movement of said arm, and a wheel spindle carried by said arm forwardly of its horizontal pivot, said yielding means engaging said arm forwardly of said horizontal pivot.

24. A steering wheel mounting for a vehicle having a chassis, comprising a member mounted to turn on said chassis about a substantially vertical axis, said member extending rearwardly of said axis, an arm pivoted on said member at a point to the rear of said vertical axis to turn about a substantially horizontal axis, means yieldingly resisting upward movement of said arm, and a wheel spindle carried by said arm forwardly of its horizontal pivot, said yielding means engaging said arm forwardly of said horizontal pivot and substantially adjacent the wheel spindle.

25. A steering wheel mounting for a vehicle having a chassis, comprising a member mounted to turn on said chassis about a substantially vertical axis, said member extending rearwardly of said axis, an arm pivoted on said member at a point to the rear of said vertical axis to turn about a substantially horizontal axis, means yieldingly resisting upward movement of said arm, and a wheel spindle carried by said arm forwardly of its horizontal pivot, said yielding means engaging said arm forwardly of said horizontal pivot.

GUSTAVE EMILE CHÉDRU.